(12) United States Patent
Sung et al.

(10) Patent No.: US 11,631,518 B2
(45) Date of Patent: Apr. 18, 2023

(54) POWER INDUCTOR WITH VARIABLE WIDTH AIR GAP

(71) Applicant: Ford Global Technologies, LLC, Dearborn, MI (US)

(72) Inventors: Myung Ki Sung, Ypsilanti, MI (US); Wanfeng Li, Novi, MI (US); Leyi Zhu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 805 days.

(21) Appl. No.: 16/556,117

(22) Filed: Aug. 29, 2019

(65) Prior Publication Data

US 2021/0065958 A1   Mar. 4, 2021

(51) Int. Cl.
*H01F 3/14* (2006.01)
*H01F 27/24* (2006.01)
*H01F 27/12* (2006.01)
*H01F 27/02* (2006.01)
*H01F 27/28* (2006.01)

(52) U.S. Cl.
CPC ............. *H01F 27/12* (2013.01); *H01F 27/02* (2013.01); *H01F 27/24* (2013.01); *H01F 27/28* (2013.01)

(58) Field of Classification Search
CPC .......... H01F 27/12; H01F 27/02; H01F 27/24; H01F 27/28; H01F 3/14; H01F 27/266; H01F 27/2847; H01F 29/10; H01F 37/00; H01F 38/023; H01F 2038/426; F03G 7/06; H02M 3/158
See application file for complete search history.

(56) References Cited

U.S. PATENT DOCUMENTS

| | | | |
|---|---|---|---|
| 4,240,057 A * | 12/1980 | Decher | H01F 38/10 336/212 |
| 6,583,701 B2 | 6/2003 | Sun et al. | |
| 7,236,076 B2 * | 6/2007 | Lee | H01F 29/10 336/178 |
| 8,466,766 B2 | 6/2013 | Carsten | |
| 9,490,056 B2 * | 11/2016 | Lee | H01F 17/0033 |

FOREIGN PATENT DOCUMENTS

| | | | | |
|---|---|---|---|---|
| BE | 878303 A | * | 12/1979 | ............... H01F 3/14 |
| JP | 2012134263 A | | 7/2012 | |

* cited by examiner

*Primary Examiner* — Tuyen T Nguyen
(74) *Attorney, Agent, or Firm* — David B Kelley; Brooks Kushman P.C.

(57) ABSTRACT

A power inductor includes a housing and a magnetic core disposed in the housing. The core includes a first segment and a second segment spaced apart from each other to define a gap. The first and second segments are supported in the housing such that the they are movable relative to each other to increase and decrease the size of the gap. A fluid having a positive thermal expansion coefficient is disposed in the housing such that expansion and contraction of the fluid due to change in temperature increases and decreases the gap, respectively.

19 Claims, 5 Drawing Sheets

POWER INDUCTOR WITH VARIABLE WIDTH AIR GAP

TECHNICAL FIELD

This disclosure relates to power inductors and more specifically to power inductors having multi-segment cores in which at least some of the segments are movable relative to each other to vary size of the gap between adjacent segments.

BACKGROUND

Electric vehicles may include a voltage converter (e.g., a DC-DC converter) connected between the battery and the electric machine. Electric vehicles that have alternating current (AC) electric machines also include an inverter connected between the DC-DC converter and each electric machine. A voltage converter increases ("boosts") or decreases ("bucks") the voltage potential to facilitate torque capability optimization. The DC-DC converter includes an inductor (or reactor), switches and diodes. A typical inductor includes a conductive coil that is wound around a magnetic core.

SUMMARY

According to one embodiment, a power inductor includes a housing, a magnetic core disposed in the housing, and windings coiled around the core. The core includes a first segment and a second segment spaced apart from each other to define a gap. The first and second segments are supported in the housing such that the they are movable relative to each other to increase and decrease the size of the gap. A fluid packet is disposed in the gap and includes a fluid encapsulated in a flexible membrane. The fluid has a positive thermal expansion coefficient configured to enlarge the packet in response to a temperature of the fluid increasing to separate the first and second segments and increase a width of the gap, and configured to contract the packet in response to the temperature decreasing. A damper is provided to urge the first and second segments towards each other and reduce the width of the gap as the packet contracts.

According to another embodiment, a power inductor includes a housing and a magnetic core disposed in the housing. The core includes a first segment and a second segment spaced apart from each other to define a gap. The first and second segments are supported in the housing such that the they are movable relative to each other to increase and decrease the size of the gap. A fluid having a positive thermal expansion coefficient is disposed in the housing such that expansion and contraction of the fluid due to change in temperature increases and decreases the gap, respectively.

According to yet another embodiment, a power inductor includes a housing and a magnetic core disposed in the housing. The core includes a first segment and a second segment spaced apart from each other to define a gap. The first and second segments are supported in the housing such that they are movable relative to each other to increase and decrease the size of the gap. A passive actuator is disposed in the housing and is configured to move the second segment relative to the first segment to increase and decrease the size of the gap. The passive actuator includes a shape-memory alloy configured to expand as temperature of the inductor increases to urge the first and second segments apart to increase the gap and to contract as the temperature decreases so that the first and second segments move towards each other to decrease the gap.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may include an electric powertrain that includes at least one traction motor for powering driven wheels. The traction motor may be powered by a traction battery. The battery is a high-voltage battery capable of outputting electrical power to operate the motor. The battery also receives electrical power from the motor when operating as a generator. A high-voltage bus electrically connects the battery to the motor. The vehicle may include one or more controllers for operating various components. The vehicle controllers generally include any number of microprocessors, ASICs, ICs, memory (e.g., FLASH, ROM, RAM, EPROM and/or EEPROM) and software code to co-act with one another to perform a series of operations. The controllers also include predetermined data, or "look-up tables" that are based on calculations and test data and stored within the memory. The controllers communicate with other vehicle systems and each other over one or more wired or wireless vehicle connections using common bus protocols (e.g., CAN and LIN).

The vehicle may include a DC-DC converter or variable voltage converter (VVC) and an inverter. The VVC and the inverter are electrically connected between the battery and the motor. The VVC may "boost" or increases the voltage potential of the electrical power provided by the battery and may "buck" or decreases the voltage potential of the electrical power provided to the battery. The inverter inverts the direct current (DC) power supplied by the battery (through the VVC) to AC power for operating the motor. The inverter also rectifies AC to DC.

Figure 1:
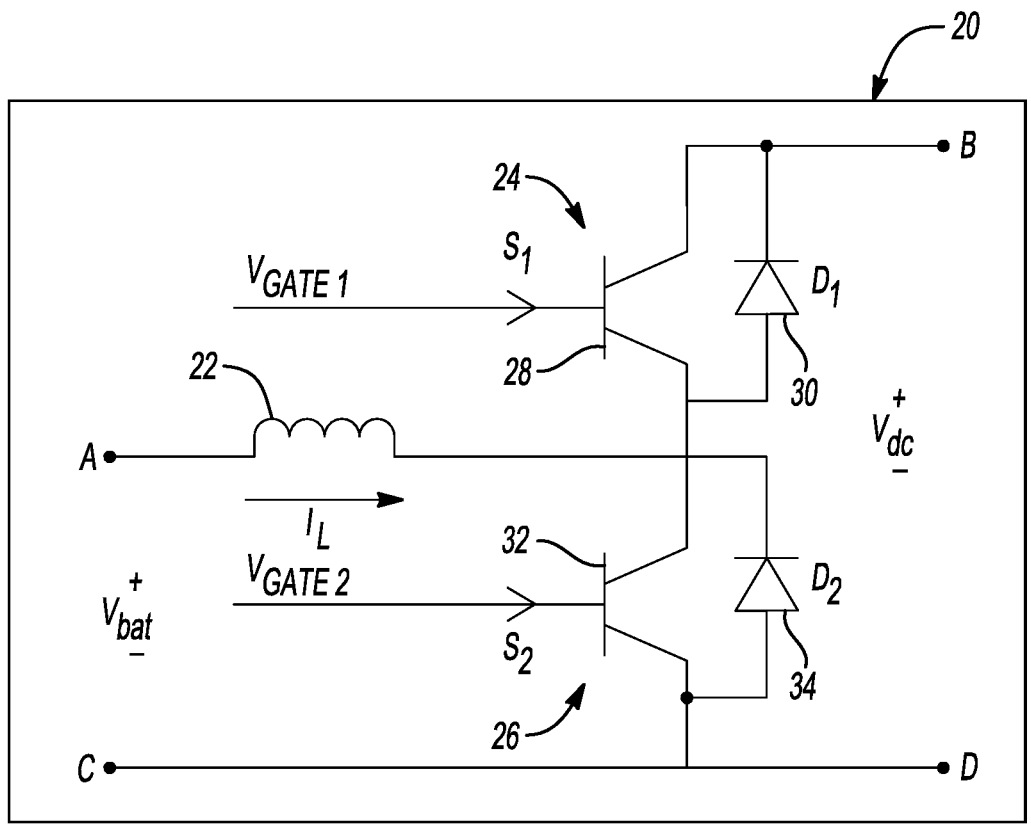
FIG. 1 is a circuit diagram of a variable-voltage converter.

Referring to FIG. 1, a VVC 20 includes a power inductor 22. The VVC 20 also includes a number of switches and diodes. For example, the VVC 20 includes a first switching unit 24 and a second switching unit 26 for boosting the input voltage ($V_{bat}$) to provide output voltage ($V_{dc}$). The first switching unit 24 includes a first transistor 28 connected in parallel to a first diode 30, but with their polarities switched (anti-parallel). The second switching unit 26 includes a second transistor 32 connected anti-parallel to a second diode 34. Each transistor 28, 32 may be any type of controllable switch (e.g., an insulated gate bipolar transistor (IGBT) or field-effect transistor (FET)). Additionally, each transistor 28, 32 is individually controlled by a controller. The inductor 22 is depicted as an input inductor connected in series between the battery and the switching units 24, 26. The inductor 22 generates magnetic flux when current is supplied. When the current flowing through the inductor 22 changes, a time-varying magnetic field is created, and voltage is induced. The VVC 20 may also include different circuit configurations (e.g., more than two switches).

The following Figures and related text describe example power inductors according to one or more aspects of this disclosure.

Figure 2:
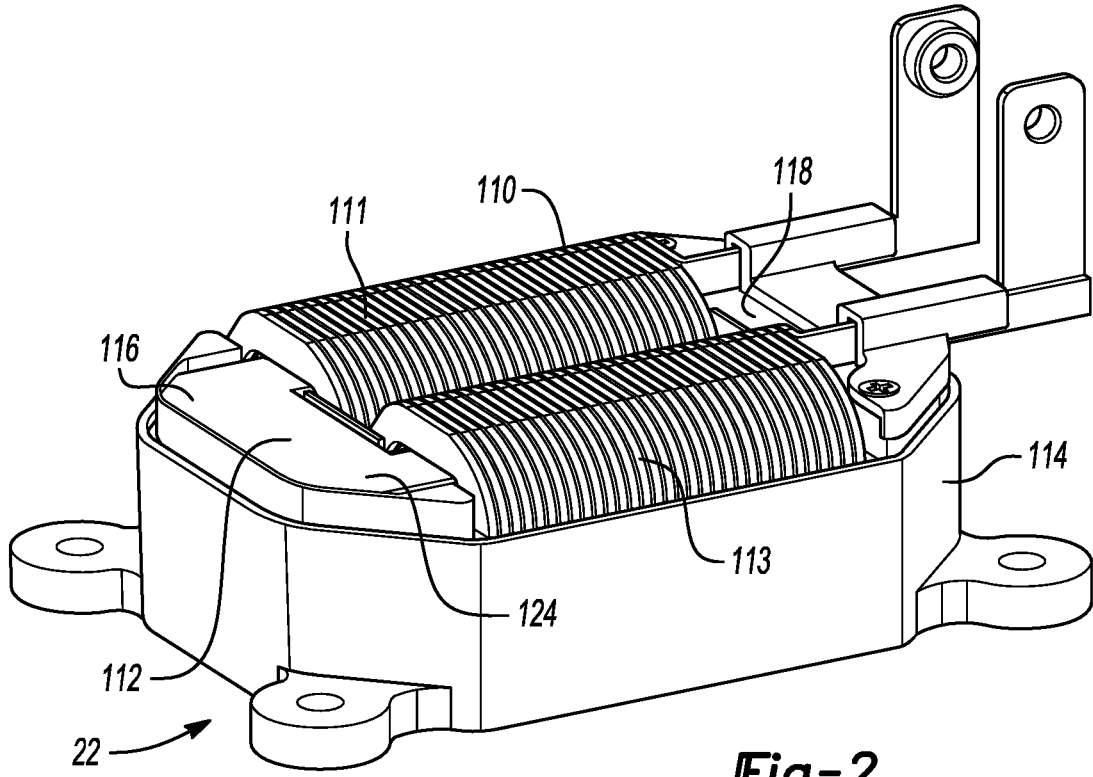
FIG. 2 is perspective view of a power inductor.
Figure 3:
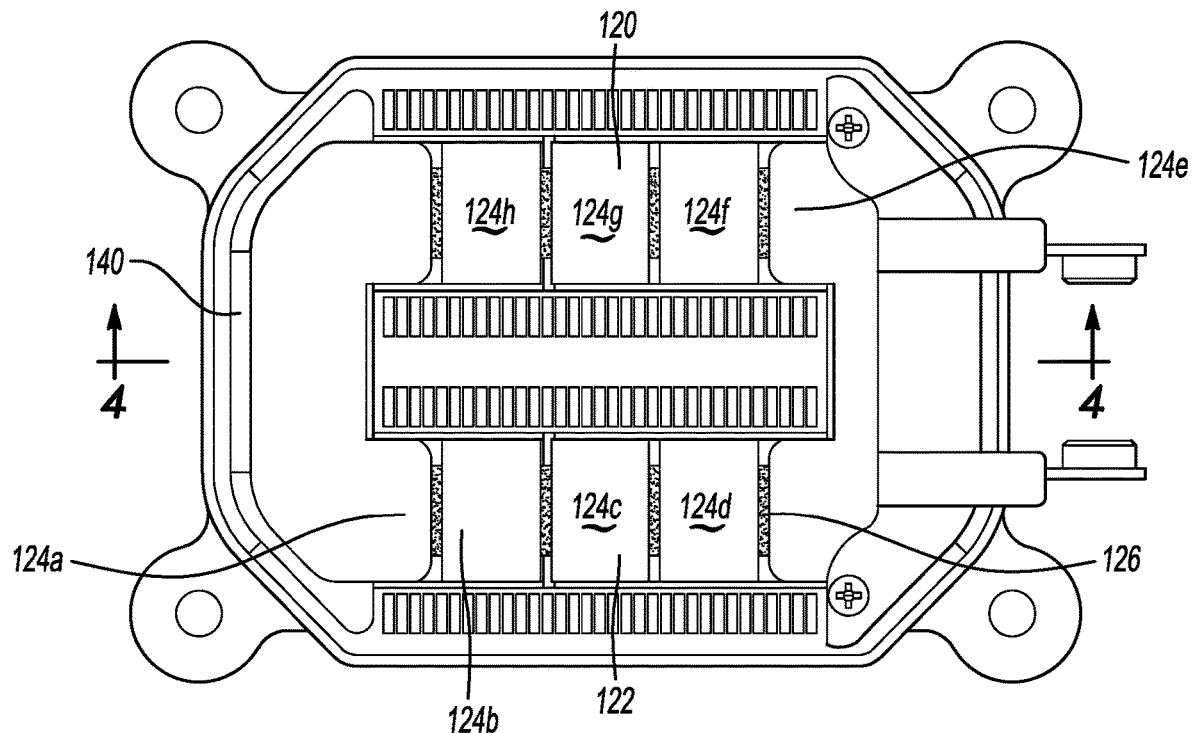
FIG. 3 is a top view of the inductor with the coils removed from illustrative purposes.

Referring to FIGS. 2 and 3, the inductor assembly 22 includes a conductor 110 that is formed into two adjacent tubular coils, a core 112 and a housing 114. The conductor 110 is formed of a conductive material, such as copper or aluminum, and wound into two adjacent helical coils, a first coil 111 and a second coil 113. The coils may be formed using a rectangular (or flat) type conductive wire by an edgewise process. Input and output leads extend from the conductor 110 and connect to other components.

The core 112 may be formed as a dual "C" configuration. The core 112 includes a first end 116 and a second end 118 that are each formed in a curved shape. The core 112 also includes a first leg 120 and a second leg 122 for interconnecting the first end 116 to the second end 118 to collectively form a ring-shaped core 112. The core 112 may be formed of a magnetic material, such as an iron-silicon alloy powder. While not illustrated, the inductor 22 may or may not include an insulator. If provided, the insulator may be formed as a bobbin structure that separates the coils from the core.

Rather than being solid, the core 112 is formed of a plurality of segments 124 that are spaced apart to define a plurality of air gaps 126 between adjacent ones of the segments 124. The air gaps 126 are provided to help prevent saturation of the core 112 during high current levels. The air gaps 126, however, increased resistance within the core 112, which reduces efficiency of the inductor 22. Prior art designs include fixed spacing between the segments, i.e., the width of the air gaps do not change, and choose a gap size that strikes a balance between efficiency and saturation prevention. In the inductor 22, the segments 124 are movable relative to each other to provide variable width air gaps. This allows the air gaps to be reduced when advantageous and increased when advantageous. Generally, the air gaps are reduced in size during low current to increase efficiency of the inductor 22, and are increased in size during high current to inhibit saturation conditions.

Figure 4:
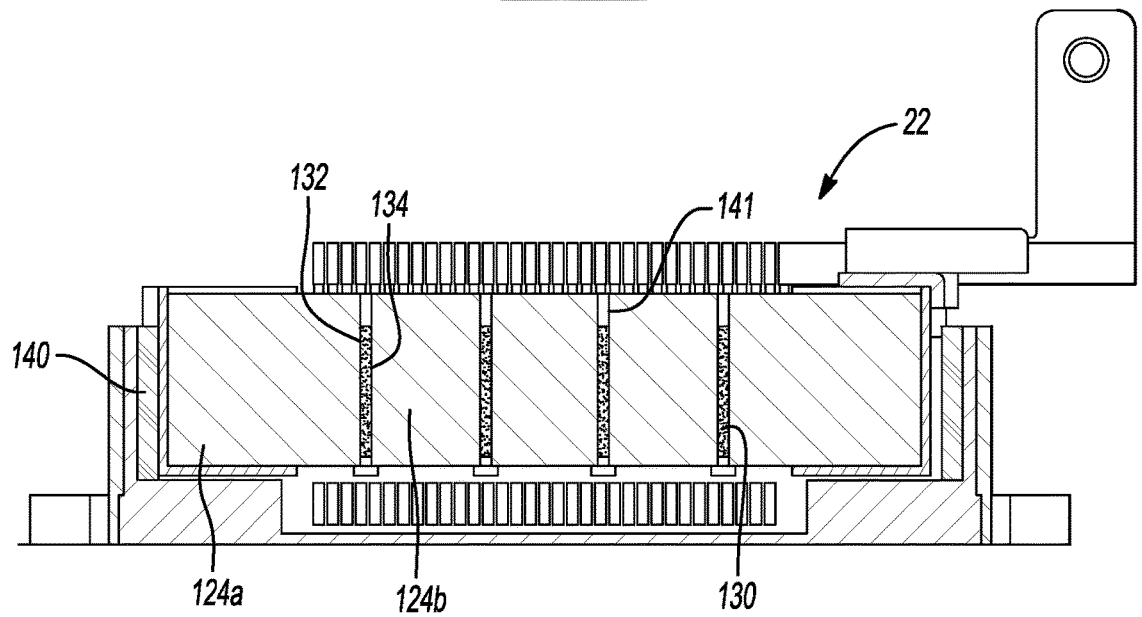
FIG. 4 is a side cross-sectional view of the inductor of along cutline 4-4.

Referring to FIG. 4, a thermally expanding fluid may be used to move the segments 124 relative to each of. The fluid has a positive thermal expansion coefficient so that the fluid expands as the inductor 22 warms and contracts as the inductor 22 cools. Generally, the temperature of the inductor is proportional to the current level, e.g., the temperature of the inductor increases as the current level increases. The fluid is placed so that adjacent segments move away from each other, due to the expansion of fluid, as the current levels of the inductor 22 rise.

According to one embodiment the inductor 22 includes a plurality of fluid packets 130 that are disposed within the gaps 126. Each of the fluid packets 130 includes fluid 132 encapsulated in a membrane 134. The membrane 134 is stretchable so that the fluid packet 130 enlarges as temperature increases and retracts as temperature decreases. The fluid 132 may be a thermal oil having a thermal expansion coefficient of at least 0.0008 per degrees Kelvin (K). Many commercial thermal oils are available, and these commercial oils typically have a thermal expansion coefficient of 0.00102/K. The membrane 134 may be, but is not limited to, of thin, flexible plastic or polymer materials. The fluid packets 130 are disposed within the air gaps 126 and are configured to engage with faces 141 of the segments 124. The fluid packets 130 urge the adjacent segments 124 away from each other and increase the width of the gap 126 when the packet 130 enlarge due to increased temperature of the fluid 132.

Figure 5A:
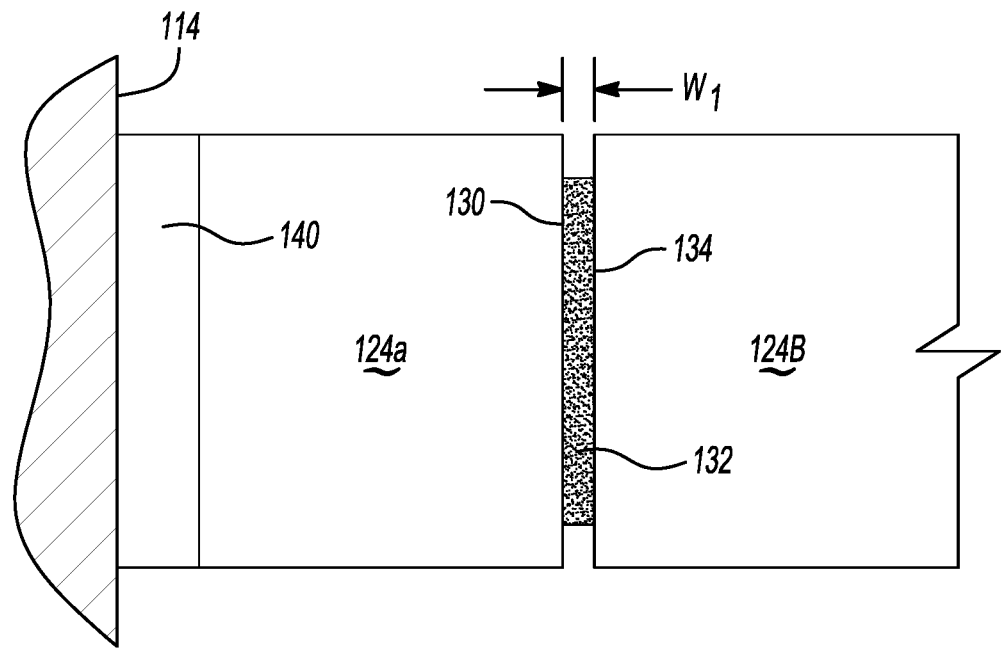
FIG. 5A is a diagrammatically representation of core segments in a lower temperature condition.
Figure 5B:
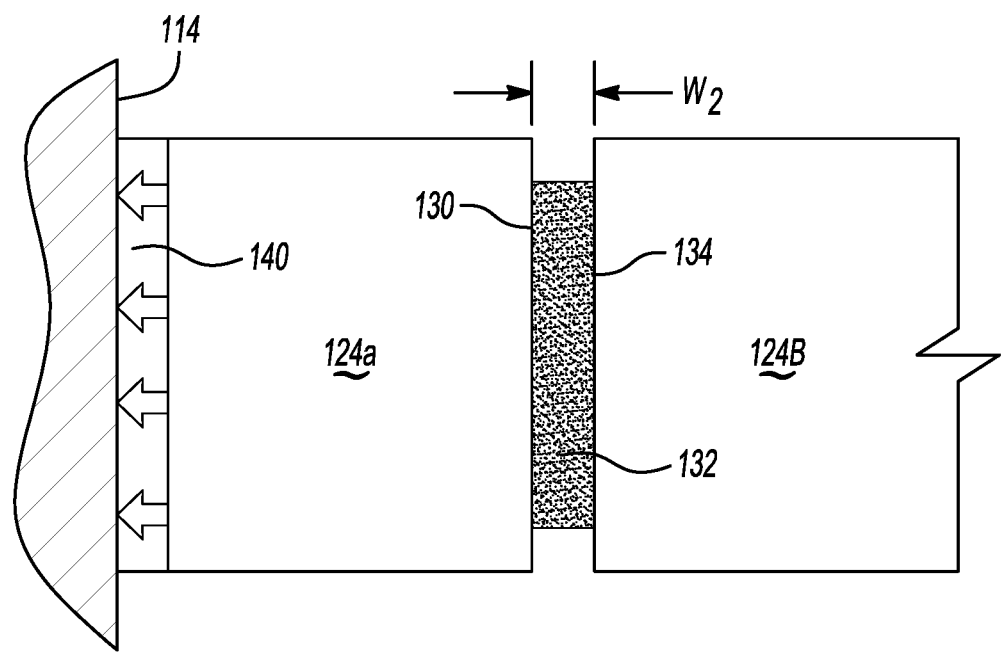
FIG. 5B is a diagrammatically representation of the core segments in a higher temperature condition.

FIGS. 5A and 5B illustrate movement of a pair of adjacent segments 124a and 124b during a low current, low temperature condition (FIG. 5A) and a high current, high temperature condition (FIG. 5B). In FIG. 5A, the fluid 132 of the fluid packet 130 is relatively cold which places the fluid packet 130 in a contracted condition, which results in the air gap 126 having a first width ($W_1$). As the inductor 22 heats up, due to increased current, the fluid 132 thermally expands causing the packet 130 to enlarge. As the packet 130 enlarges, the segments 124a and 124b are driven apart increasing the width of the gap to $W_2$. The variability of the gap width depends upon the amount of fluid in the packet and the thermal expansion coefficient of the fluid. According to one embodiment, the inductor is designed to increase the gap width by up to 50 percent, however, this can be modified as needed.

The inductor 22 may include one or more dampers 140 for accommodating movement of the segments 124. According to one embodiment, a single damper 140 is disposed between the housing 114 and the segment 124a. The damper 140 not only deforms to allow movement of the segments 124 but also is resilient to rebound and reposition the segments 124 when the fluid packets 130 contract and the separating force is released. Referring back to the example of FIGS. 5A and 5B, the damper 140 is compressed when the fluid packets 130 expand (as shown in FIG. 5B) allowing the gap to increase to $W_2$ and urges the core segment 124a towards the segment 124b when the fluid packet 130 contracts to reduce the gap back to $W_1$.

Referring back to FIG. 3, in one embodiment, a single damper 140 is placed between the housing 114 and the segment 124*a*. Here, the segment 124*e* is fixed to the housing 114 and the remaining segments 124 float. When the fluid packets 130 thermally expand, all of the segments except 124*e* shift left to increase the widths of the gaps 126 and the damper 140 is compressed to allow the displacement. When the packets 130 thermally contract, the damper 140 rebounds pushing the segments 124 right to reduce the width of the gaps 126. In another embodiment, the central segments 124*c* and 124*g* are fixed and two dampers are used: one being disposed between the housing 114 and the segment 124*a* and the other being disposed between the housing 114 and the segment 124*e*. Of course, other configurations are contemplated by this disclosure.

Figures 6, 7:
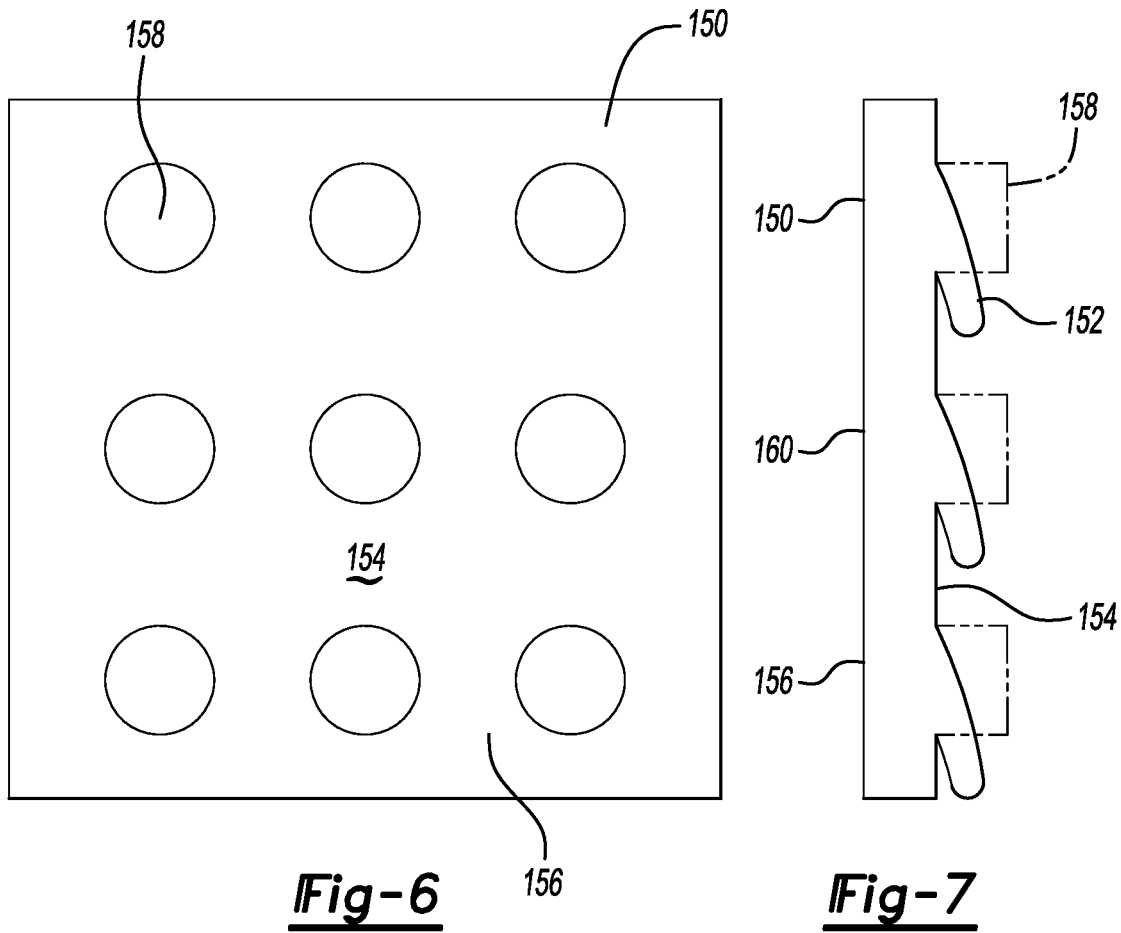
FIG. 6 illustrates a front view of a fluid packet according to an alternative embodiment; the packet being shown in an enlarged position.
FIG. 7 illustrates a side view of the fluid packet of FIG. 6 with solid lines showing a contracted position and phantom lines showing an enlarged position.

FIGS. 6 and 7 illustrate a fluid packet 150 according to another embodiment. The fluid packet 150 includes a plurality of pockets 152 that serve as projections to increase the enlargement of the packet 150 and create greater variability of the gap width. The pockets 152 are formed in a side 154 of the membrane 156 that engaged with a core segment. As seen in FIG. 7, the pockets 152 are deflated when the fluid is cold. As the fluid temperature increases, the fluid expands into the pockets 152 which then inflate to form projections 158 that engage with the core segment. That is, the pockets 152 are deflated when the fluid is below a first threshold temperature and are inflated to form projections 158 when above a second threshold temperature. While the pockets 152 are illustrated on only one of the sides, additional pockets may be formed on the other side 160 that engages with the other core segment. The projections 158 may be cylindrically shaped as shown or may be a any other suitable shape. Increasing and decreasing the size and/or the number of pockets 152 can be used to tune the amount of expansion of the air gap. Generally, providing fewer, longer pockets results in larger gaps.

Figure 8:
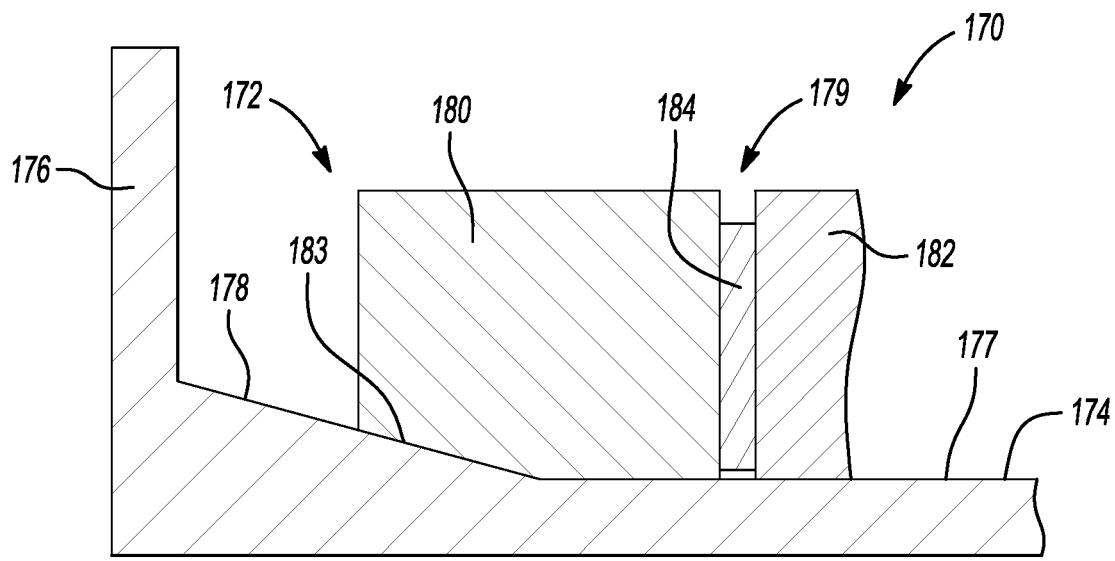
FIG. 8 illustrates a side cross-sectional view of another power inductor.

FIG. 8 illustrates another power inductor 170 that is similar to the above-described power inductor except the damper is replaced with an inclined plane 172. The inclined plane 172 may be formed on a floor 174 of the housing 176. The floor 174 may have a generally flat portion 177 and an inclined portion 178 disposed near the one end. The floor may be inclined, for example, at an angle between 5 and 20 degrees relative to the flat portion 177. The inclined plane 172 slopes upwardly away from the gap 179. The adjacent core segment 180 may include a slanted side 183 configured to ride on the inclined portion 178. The angle of the slanted side 183 may substantially match that of the inclined portion 178. The inclined plane 172 biases the core segment 180 towards the core segment 182. When the fluid packet 184 thermally expands, the core segment 180 slides up the inclined portion 178 to enlarge the gap 179. When the fluid packet 184 contracts, gravity causes the core segment 180 to slide back down the inclined portion 178 towards the core segment 182 reducing the gap 179.

Figure 9A:
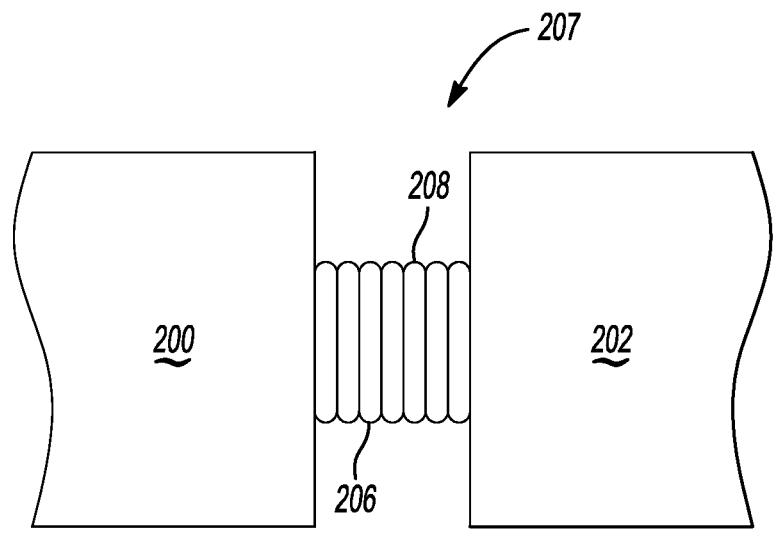
FIG. 9A is a diagrammatically representation of core segments of yet another power inductor in a lower temperature condition.
Figure 9B:
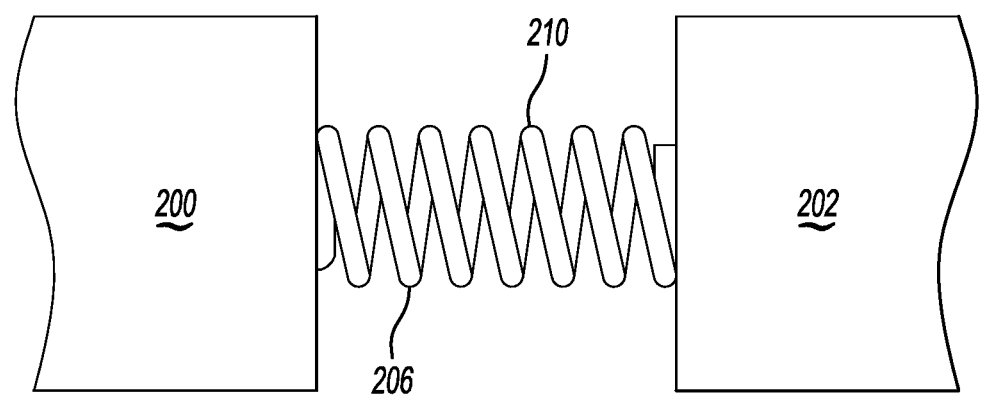
FIG. 9B is a diagrammatically representation of the core segments of the yet another power inductor in a higher temperature condition.

FIGS. 9A and 9B illustrate representative core segments 200 and 202 of the yet another power inductor. The yet another power inductor may be similar to the power inductor 22 except that the fluid packets are replaced with one or more passive actuators 206. A passive actuator is an actuator that automatically actuates without involvement of other systems. A passive actuator 206 is temperature controlled and is configured to automatically actuate the core segments 200 and 202 based on change of temperature to vary the width of the air gap 207. In the illustrated embodiment, the passive actuator 206 is configured to retract as temperature decreases and expand as temperature increases. However, this could be switched in other embodiments.

The passive actuator 206 includes a shape-memory alloy 208 configured to expand as temperature of the inductor increases to urge the first and second segments 200, 202 apart to increase the gap and to contract as the temperature decreases so that the first and second segments 200, 202 move towards each other to decrease the gap. The inductor may include a plurality of passive actuators 206 that are each disposed in an associated one of the air gaps similar to the above-described fluid packets.

In the illustrated embodiment, the passive actuator 206 is a coil 210 formed of shape-memory alloy. The shape-memory alloy may be a non-magnetic alloy to prevent interference with the magnetic core of the inductor. Example alloys include, but are not limited to, copper-zinc alloy or nickel-titanium alloy. The coil 210 has a first length (FIG. 9B) when a temperature of the coil is above a first threshold and a second, shorter length (FIG. 9A) when the temperature of the coil is below a second threshold. The first and second thresholds may be substantially the same, that is, the shape-memory alloy quickly switches between the first and second lengths at a threshold temperature, or the coil 210 may gradual change shape as the temperature changes. The coil 210 may be connected to the segments 200 and 202. For example, a first end of the coil is attached to segment 200 and a second end of the coil is connected to segment 202. This allows the coil 210 to push the segments 200, 200 apart as the coil expands and to pull the segments back together as the coil 210 contracts. Since the coil 210 is capable of pulling the segments back together, the above-described damper may not be required. In some embodiments though, a damper may be used in conjunction with the coils 210.

The illustrated coil 210 is but one example of a passive actuator. The shape-memory alloys may be configured in different configurations, for example, a deflectable plate may be used. The plate may include a first position in which it is planar and a second position in which it is kinked to increase the effective thickness of the plate.

The passive actuator can also be configured to expand as temperature decreases and contract as temperature increases. Here, one or more passive actuators may be disposed between the housing, or other component, and the one or more the segments rather than being disposed in the air gaps.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power inductor comprising:
a housing;
a magnetic core disposed in the housing and including a first segment and a second segment spaced apart from each other to define a gap, the first and second segments being supported in the housing such that the first and second segments are movable relative to each other to increase and decrease the size of the gap;
windings coiled around the core;
a damper; and
a fluid packet disposed in the gap, the fluid packet including a fluid encapsulated in a flexible membrane, the fluid having a positive thermal expansion coefficient configured to enlarge the packet in response to a temperature of the fluid increasing to separate the first and second segments and increase a width of the gap, and configured to contract the packet in response to the temperature decreasing to allow the damper to urge the first and second segments towards each other and reduce the width of the gap.

2. The power inductor of claim 1, wherein the damper is disposed between the housing and the first segment.

3. The power inductor of claim 1, wherein the fluid is a thermal oil.

4. The power inductor of claim 1, wherein the thermal expansion coefficient is at least 0.0008 per degrees Kelvin.

5. The power inductor of claim 1, wherein the core further includes a third segment spaced apart from the second segment to define a second gap, the second and third segments being supported in the housing such that the second and third segments are movable relative to each other to increase and decrease the size of the second gap, and further comprising a second fluid packet disposed in the second gap, the second fluid packet including a second fluid encapsulated in a second flexible membrane, the second fluid having a positive thermal expansion coefficient configured to enlarge the second packet in response to a temperature of the second fluid increasing to separate the second and third segments and increase a width of the second gap, and configured to contract the second packet in response to the temperature decreasing to allow the damper to urge the second and third segments towards each other and reduce the width of the gap.

6. A power inductor comprising:
a housing;
a magnetic core disposed in the housing and including a first segment and a second segment spaced apart from each other to define a gap, the first and second segments being supported in the housing such that the first and second segments are movable relative to each other to increase and decrease the size of the gap; and
a fluid packet having a positive thermal expansion coefficient fluid encapsulated in a flexible membrane, the fluid packet being disposed in the gap such that expansion and contraction of the fluid, due to change in temperature, increases and decreases the size of the gap, respectively.

7. The power inductor of claim 6 further comprising a damper urging the first segment towards the second segment.

8. A power inductor comprising:
a housing;
a magnetic core disposed in the housing and including a first segment and a second segment spaced apart from each other to define a gap, the first and second segments being supported in the housing such that the first and second segments are movable relative to each other to increase and decrease the size of the gap; and
a fluid having a positive thermal expansion coefficient disposed in the gap such that expansion and contraction of the fluid due to change in temperature increases and decreases the gap, respectively;
a damper disposed between the housing and one of the first and second segments, wherein the damper is configured to compress when the fluid thermally expands to allow the gap to increase in size and to rebound when the fluid thermally contracts to decrease the size of the gap.

9. The power inductor of claim 7, wherein the damper acts the housing and the first segment.

10. The power inductor of claim 6, wherein the housing includes a floor having an inclined plane sloping upwardly away from the gap, and wherein the first segment is disposed on the inclined plane so that the first segment is biased towards the second segment, wherein the first segment is configured to slide up the inclined plane in response to expansion of the fluid and slide down in response to contraction of the fluid.

11. The power inductor of claim 6, wherein the thermal expansion coefficient is at least 0.0008 per degrees Kelvin.

12. The power inductor of claim 6, wherein the fluid is a thermal oil.

13. The power inductor of claim 8, wherein the fluid is encapsulated in a membrane.

14. The power inductor of claim 6, wherein the membrane defines a plurality of pockets that are deflated when the temperature of the fluid is below a first threshold and are inflated with the fluid when the temperature of the fluid is above a second threshold.

15. The power inductor of claim 6, wherein the first and second segments include first and second sides, respectively, cooperating to the define the gap.

16. The power inductor of claim 8, wherein the membrane defines a plurality of pockets that are deflated when the temperature of the fluid is below a first threshold and are inflated with the fluid when the temperature of the fluid is above a second threshold.

17. The power inductor of claim 8, wherein the thermal expansion coefficient is at least 0.0008 per degrees Kelvin.

18. The power inductor of claim 8, wherein the fluid is a thermal oil.

19. The power inductor of claim 6, wherein the core further includes a third segment spaced apart from the second segment to define a second gap, the second and third segments being supported in the housing such that the second and third segments are movable relative to each other to increase and decrease the size of the second gap, and further comprising a second fluid packet being disposed in the second gap such that expansion and contraction of the fluid of the second fluid packet, due to change in temperature, increases and decreases the size of the second gap, respectively.

* * * * *